Feb. 6, 1951 G. H. WILLIAMS 2,540,638

AUTOMATIC STEP CONTROL OF CURRENT

Filed May 22, 1946 2 Sheets-Sheet 1

INVENTOR
GURDON H. WILLIAMS
BY H. S. Grover
ATTORNEY

AUTOMATIC STEP CONTROL OF CURRENT

Filed May 22, 1946 2 Sheets-Sheet 2

INVENTOR
GURDON H. WILLIAMS
BY H.S. Grover
ATTORNEY

Patented Feb. 6, 1951

2,540,638

UNITED STATES PATENT OFFICE 2,540,638

AUTOMATIC STEP CONTROL OF CURRENT

Gurdon H. Williams, Haddonfield, N. J., assignor to Radio Corporation of America, a corporation of Delaware Application May 22, 1946, Serial No. 671,582

13 Claims. (Cl. 250—36)

This invention relates to a method of, and apparatus for, automatically preventing electrical current from exceeding a maximum safe value in an electron discharge device system without interfering with the continuous operation of the system.

The invention is primarily designed to limit the direct current through the grid of a vacuum tube oscillation generator, but has broad application wherever there may be required a step control of an electrical current.

In using radio frequency vacuum tube oscillation generators for industrial heating purposes (for example, in an induction heating system), the load on the generator often changes under different conditions. Under normal operating conditions, the grid excitation voltage (and hence the grid direct current) increases with a decrease in load, and vice versa. When the oscillator is used for induction heating purposes, the load on the oscillator is a maximum when the work to be heated (steel, for example) is cold. As the work heats up, the load on the oscillator decreases. When the Curie point is reached (the steel is then approximately cherry red in color), the load is a minimum. As the load on the oscillator decreases, the grid direct current rises. In order to prevent the grid direct current from exceeding the maximum permissible value for the particular type of oscillator tube employed, it is necessary either to change the grid bias on the tube or else change the grid radio frequency excitation (drive). By means of the present invention, it is proposed to change the grid bias in an automatic and quick acting manner for limiting the no-load grid direct current of the radio frequency oscillator.

An object of the present invention is to automatically reduce the grid direct current of an electron discharge device oscillation generator when the load on the generator is reduced.

Another object is to provide an automatic step control of electrical current by means of electron discharge device circuits.

A more specific object is to limit the grid direct current of a radio frequency oscillator under no-load conditions by the automatic insertion of a fixed resistor in the grid circuit.

A further object is to provide automatic step control of electrical current by means of a plurality of stages operating in sequence to insert direct current impedances in the direct current circuit to thereby reduce the amount of the direct current.

Figure 1:
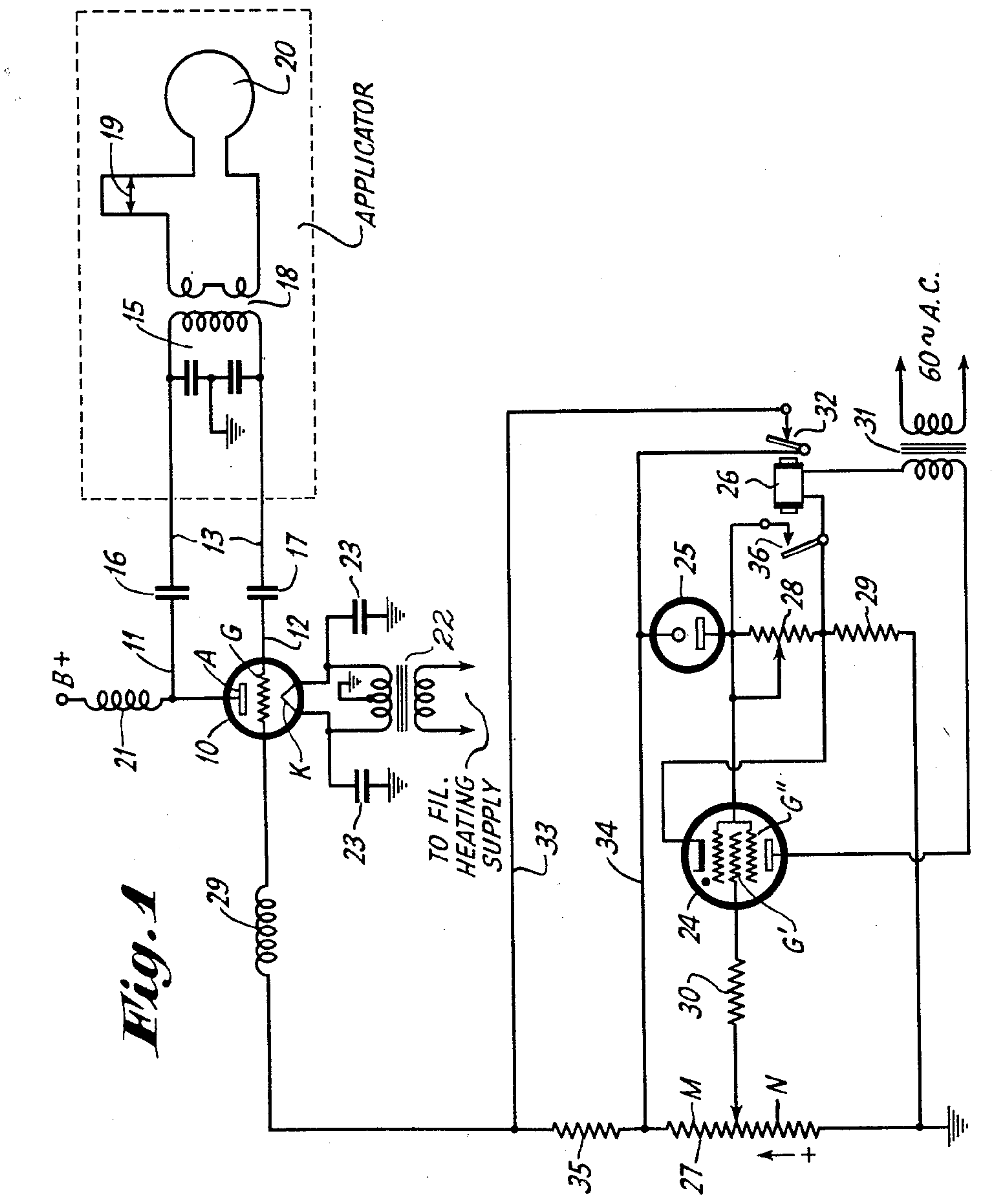
Figure 2:
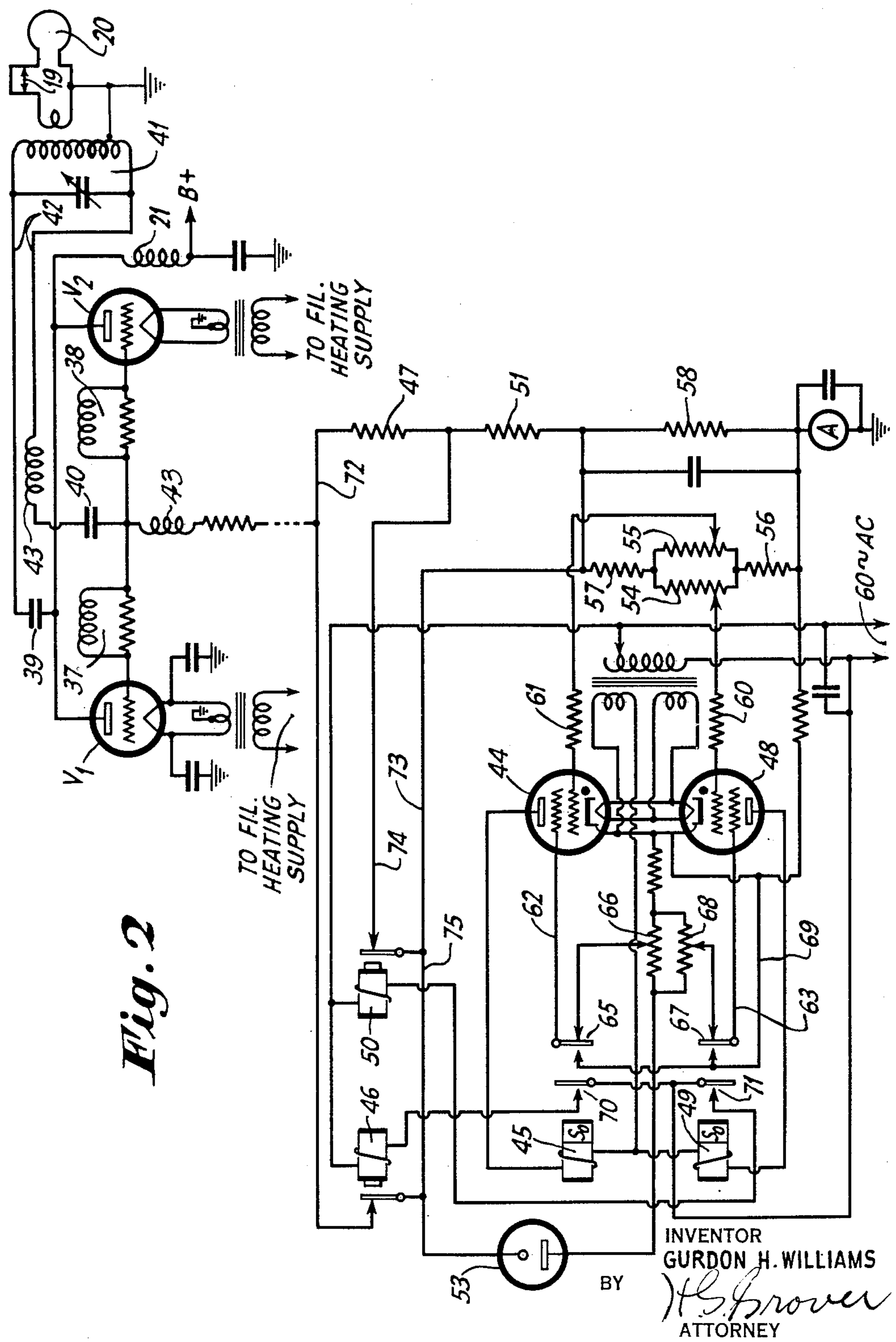

A detailed description of the invention follows in conjunction with drawings, wherein:

Fig. 1 illustrates a simplified circuit embodiment which shows the fundamental principles of the invention applied to limit the grid direct current of a radio frequency oscillator, and Fig. 2 illustrates the invention employing a plurality of direct current limiting stages operating in sequence to limit the grid direct current of a radio frequency oscillator system.

Referring to Fig. 1 of the drawing, there is shown a high frequency generator portion of a high frequency induction heating system together with the step control apparatus constituting the gist of the invention. The oscillation generator is in the form of a Colpitts oscillator circuit and comprises a vacuum tube 10 whose anode A and grid G are connected via leads 11 and 12, and line 13, to opposite terminals of the tank or frequency determining circuit 15. Blocking condensers 16 and 17 are provided between the anode and grid electrodes and the tank circuit 15. The apparatus shown in the rectangular box composed of dash lines is called the applicator unit and may be somewhat removed from the vacuum tube 10 by a distance of, let us say, twenty-five or more feet. It is for this reason that the line 13, which may be a pair of concentric cables, is provided as a link between the vacuum tube 10 and the applicator unit. Obviously, if desired, the applicator unit may be located very close to the vacuum tube 10, in which case the line 13 may be omitted or folded to enable a variation in the distance between the applicator unit and the oscillator vacuum tube.

It should be noted that the tank circuit 15 includes the primary winding of a transformer 18 whose secondary winding is connected in series with a variable reactance loop 19 and the work coil 20. The work coil 20 is adapted to be placed around the metallic object or batch of metallic material to be heated for providing large concentrations of heat. The variable reactance 19 is a power control feature in the output circuit.

The anode A of the vacuum tube oscillator 10 is supplied with direct current anode polarizing potential B+ through a suitable choke coil 21. The cathode K of the oscillation generator is supplied with filament heating through an iron core transformer 22. The mid point of the secondary winding of the transformer 22 is grounded, while the terminals of the secondary winding are shunted or by-passed to ground for high frequency energy of the operating frequency by means of by-pass condensers 23, 23.

The essence of the invention comprises the step control circuit which includes a multi-electrode gaseous tube 24, commonly known as a "thyratron," a voltage regulator tube 25, a relay 26 in the anode circuit of the gas tube 24, a potentiometer 27 having resistor portions M and N, and resistors 28 and 29, and a fixed resistor 35 adapted to be inserted into the grid circuit of the oscillator tube 10. The grid direct current for the oscillator 10 flows through inductor choke coil 29 and through potentiometer 27 to ground, as shown;

though the direction of current flow is from ground to the grid of the oscillator 10.

The thyratron electrode structure includes an anode, control grid G', a shield electrode structure G'', and a cathode or filament. The control grid G' is connected through a grid limiting resistor 30 to an adjustable tap on the potentiometer 27. This gaseous tube has 60 cycle alternating voltage supplied to its anode via iron core transformer 31 in series with the coil winding of relay 26. Hence, the anode voltage for tube 24 passes through zero during each cycle.

To fire (ignite) or trip the tube 24 from its nonconducting condition to its current conducting condition requires a certain critical value of control grid voltage relative to the cathode. After tube 24 is fired, it will remain fired (conducting) despite alternating current variations on its anode as long as the control grid voltage remains above the critical value. However, if the control grid voltage drops below the critical value, the tube 24 will cease conducting. If the shield electrode bias for the tube 24 is changed, a different critical value of control grid bias is required in order to fire the tube.

The voltage appearing between the cathode and the control grid G' of the thyratron tube 24 is always the difference between the voltage across section M of the potentiometer and the voltage across the regulator tube 25 and resistor 28 in series. The voltage drop across regulator tube 25 is always at a constant value, thus providing a voltage reference level. The voltage regulator tube 25 in series with resistors 28 and 29 provides a circuit in shunt or parallel to the potentiometer 27. The voltage drop across the voltage regulator tube 25 remains constant and is relatively high with respect to the voltage drop across resistor 28. Hence, the voltage drop across elements 25 and 28 is much more nearly constant than the voltage drop across the section M of the potentiometer. As a result of this, the effective voltage between the control grid and the cathode of the gas tube 24 varies proportionately to the flow of current through the potentiometer 27 and this current is the oscillator grid direct current. Resistor 29 limits the current through the voltage regulator tube 25 to its rated value.

It should be noted that relay 26 is shown in the de-energized position. In this position, contacts 32 are closed on each other and by virtue of leads 33 and 34 short-circuit a resistor 35 in the oscillator grid circuit. The other contacts 36 of the relay 26 are open. When the relay 26 is operated, the contacts 36 are closed and serve to short-circuit resistor 28, while contacts 32 will open and remove the short circuit from resistor 35, effectively inserting resistor 35 in the grid circuit.

The tap on the potentiometer 27 determines the value of grid direct current which will give critical voltage on the control grid G' of the gas tube 24 to fire this tube. The grid direct current for the oscillator tube 10 flows from the ground terminal of potentiometer 27 (herein designated +) to the oscillator grid in the direction of the arrow.

In the operation of the system of the invention, relay 26 will normally be unenergized, as a result of which resistor 35 will be short circuited and resistor 28 effectively in series with the voltage regulator tube 25 and resistor 29. It is now assumed that the gas tube 24 is non-conducting. When there is maximum load on the oscillation generator 10 corresponding to minimum oscillator grid direct current, there is enough direct current flow through potentiometer 27 to produce more than sufficient voltage across the regulator tube 25 to keep it fired. As mentioned above, regulator tube 25 maintains constant voltage across its terminals, let us say by way of example, 75 volts. As the load on the oscillator 10 decreases, the oscillator grid direct current through potentiometer 27 continues to rise with a concomitant decrease in negative bias on the thyratron grid G'; and when this oscillator grid direct current reaches a predetermined maximum value above which it is not desirable to operate the oscillator system, a critical voltage is established on the thyratron grid, as a result of which thyratron 24 becomes conducting. When the gas tube 24 becomes conducting, the resultant current through the winding of relay 26 causes this relay to operate and short-circuit resistor 28, due to the closure of contacts 36, and to remove the short circuit from resistor 35 due to the opening of contacts 32. The short-circuiting of resistor 28 removes the bias from the shield electrode G'' of the gas tube 24, thus changing the operating characteristic of the thyratron so that the critical control grid voltage for this tube is reduced to a value less than that previously required to fire the thyratron tube.

The effective insertion of resistor 35 in the oscillator grid circuit due to the opening of contacts 32 of relay 26 reduces the oscillator grid direct current to a value slightly higher than that which is required to maintain the thyratron tube 24 conducting under the changed conditions, while limiting the oscillator grid direct current to a safe value. In actual practice, it is desirable to shift the thyratron tube characteristic by short-circuiting resistor 28 at a time slightly before the time that resistor 35 is inserted into the oscillator grid circuit, in order to prevent the thyratron tube 24 from cutting off when the oscillator grid direct current is reduced, thus assuring stable operation. It has been assumed that the maximum oscillator grid direct current at no-load condition will not exceed a safe value after the insertion of resistor 35.

If the load on the oscillator is increased, after the thyratron tube has fired, the oscillator grid direct current will decrease; and if this decrease reaches a point sufficient to reduce the bias on the control grid G' of the thyratron to the critical value corresponding to zero shield bias, the thyratron will cut off, that is, become non-conducting. When the thyratron tube cuts off, the relay 26 de-energizes and returns to normal, thus removing the short-circuit from resistor 28 and placing a short-circuit on resistor 35. The removal of the short-circuit from resistor 28 again places a negative bias on the shield electrode and changes the critical control grid bias (in contra-distinction to any actual change in control grid voltage) back to the original value. In other words, the removal of the short-circuit from resistor 28 changes the characteristic of the thyratron tube 24 so that this tube operates at a different value of critical bias on the control grid G'.

The tap on resistor 28 enables an adjustment of the range of difference between the operated and non-operated critical control grid bias for the gas tube 24, thus enabling a compensation for differences in thyratron tubes due to manufacturing variations.

In one embodiment of the invention actually tried out in practice, the gas tube 24 was an RCA 2050 tube. With resistor 28 effectively in circuit with the shield electrode G'', corresponding to a shield electrode bias of −10 volts relative to the cathode, the critical value of control grid voltage required to fire this gas tube was +3.5 volts. With resistor 28 short-circuited, corresponding to the situation where the shield electrode bias is zero, this critical value of control grid voltage to fire the tube 24 was −3.2 volts.

It has been found in practice that under some circumstances the use of a step control system such as shown in Fig. 1, involving the employment of only one stage (including the gas tube 24 and one resistor 35), is not sufficient to limit the oscillator grid direct current to a safe value. In such case, two or more sequentially operated stages may be used, wherein each stage employs a gas tube (thyratron), a relay in the anode circuit of the gas tube, and a resistor for insertion in the grid circuit. A single voltage regulator tube may be used in common to all of these stages.

Fig. 2 shows how the invention can be applied to an oscillator system employing two stages of step control for sequentially introducing resistors in the oscillator grid circuit as the oscillator grid direct current attempts to rise above a safe value. Although the oscillator of Fig. 2 shows two tubes, it should be understood that, if desired, the single tube oscillator of Fig. 1 could be used.

Referring to Fig. 2 in more detail, the high frequency generator portion of an induction heating system is shown as comprising two vacuum tubes V1 and V2 in electrically parallel relation connected as a Hartley oscillator. The anodes of the tubes V1 and V2 are directly connected together while the grids are connected together through parasitic suppressor circuits 37 and 38 arranged in series between the grids. The anodes and grids are connected through blocking condensers 39 and 40 to a tank circuit 41 via leads 42. Each of the leads 42 may constitute the inner conductor of a concentric line. The tank circuit 41 and the work coil 20 are located in an applicator unit or work cabinet. A choke coil 43 is arranged in series with the blocking condenser 40 and constitutes therewith a parasitic suppressor. Putting it in other words, condenser 40 and choke coil 43 are series tuned to suppress parasitics. This series circuit is tuned to the fundamental frequency, thus providing a low impedance to energy of the operating frequency but a high impedance to harmonics.

The essence of the invention of the system of Fig. 2 lies in the use of two stages for providing automatic step control of the oscillator grid current. One stage comprises the gas tube 44, the slow operating relay 45 in its anode circuit, the alternating current relay 46 controlled from the contacts of relay 45, and the grid resistor 47. The other stage comprises the gas tube 48, the slow operating relay 49 in the anode circuit of this tube, the alternating current relay 50 controlled by the contacts of relay 49, and the resistor 51 adapted to be inserted in the oscillator grid circuit. A voltage regulator tube 53 is employed in common for both stages. If the load on the oscillation generator decreases and the oscillator grid direct current attempts to rise above the safe value, first one stage will operate to insert its resistor 47 in the oscillator grid circuit, and then if the oscillator grid direct current continues to rise to a point where the current again reaches the maximum safe value, the second stage will operate to insert a second resistor 51 into the oscillator grid circuit.

In Fig. 2, there are shown two potentiometers 54 and 55 which correspond to the potentiometer 27 of Fig. 1. These potentiometers are arranged in series with resistors 56 and 57 and this specific portion of the circuit is shunted by a heavy resistor 58 in the oscillator grid circuit. Resistor 58 is a high wattage resistor usually placed at some distance from the step control stages. The potentiometers 54 and 55 and the resistors 56 and 57 are low wattage resistors and take considerably less current than the resistor 58. The voltage across the potentiometers 54 and 55 and resistors 56 and 57 in series is always equal to the voltage across resistor 58. Each potentiometer 54 and 55 adjusts the voltage on the control grid of its associated gas tube (thyratron), and the taps on these potentiometers are so set that one thyratron will fire before the other. Thus, the control grid of gas tube 48 is connected through current limiting resistor 60 to a tap on potentiometer 54, while the control grid of gas tube 44 is connected through a current limiter resistor 61 to a tap on potentiometer 55.

The relays 45 and 49 in the anode circuits of the two step control stages correspond to the relay 26 of Fig. 1. Instead of each of these relays short circuiting a resistor, when actuated, as shown in Fig. 1, they merely switch the connection 62 or 63 for the shield electrode of tube 44 or tube 48, respectively, directly to the cathode of the gas tube, thus establishing zero shield bias. Normally, the shield electrode of tube 44 is connected through connection 62 and armature 65 of relay 45 to the potentiometer 66 and thence to the cathode of tube 44. Similarly, the shield electrode of gas tube 48 is connected through lead 63 and armature 67 of relay 49 to the potentiometer 68 and thence to the cathode of the gas tube. When relay 45 is operated, the armature 65 is pulled over to open the connection to the potentiometer 66 and serves to connect the shield electrode connection 62 to the cathode of tube 44 through the outer "make contact" of the relay 45 and lead 69. Similarly, when relay 49 operates, the shield grid connection 63 for the tube 48 is no longer connected to the potentiometer 68 but is directly connected to the cathode of the tube 48 through an armature 67 and the outer "make contact" of the relay 49 and lead 69.

Each of the relays 45 and 49 has in circuit therewith additional contacts 70 and 71 for operating alternating current relays 46 and 50, respectively. Alternating current relay 46 functions to insert or remove from the oscillator grid circuit the resistor 47 by way of leads 72, 75 and 74 and the contacts of this relay. The alternating current relay 50, when operated, serves to insert or remove from the oscillator grid circuit the resistor 51 by virtue of the leads 74 and 73 and the contacts of this relay. The purpose of these alternating current relays 46 and 50 is to assure that the new thyratron characteristic is established before the resistors 47 or 51 are inserted or removed from the oscillator grid circuit.

Relays 45 and 49 are slow operating relays in order to prevent chattering due to the pulsating character of the anode current of the gas tubes 44 and 48.

In the operation of the two-stage step control system of Fig. 2, both resistors 47 and 51 will normally be short-circuited by the alternating current relays 46 and 50 during maximum load conditions on the oscillation generator portion of the system. This is because relays 46 and 50 will be un-energized due to the fact that relays 45 and 49 are un-energized. As the load on the oscillator decreases, the oscillator grid direct current increases through resistor 58, and if this increase in grid direct current reaches the maximum safe operating value for the oscillator tubes, gas tube 44 of stage 1 will fire and cause the resistor 47 to be effectively inserted in the oscillator grid circuit, by causing relays 45 and 46 to operate and removing the short circuit on resistor 47 at the contacts of relay 46. Now, if the oscillator grid direct current continues to rise slightly above this maximum safe operating value, then gas tube 48 of stage 2 will fire and cause the effective insertion of the second resistor 51 in the oscillator grid circuit, by causing relays 49 and 50 to operate. It has been assumed, of course, that tubes 44 and 48 are non-conducting during maximum load conditions on the oscillator. The operation of the two step control stages in sequence is achieved by differently biasing the control grids of the two gas tubes 44 and 48 by means of the taps on their respective potentiometers 55 and 54. If, after both step control stages have operated to insert the two resistors 47 and 51 in the oscillator grid circuit, the load on the oscillator should increase, it will be evident that there will be a corresponding decrease in the oscillator grid direct current. If this decrease in the oscillator grid direct current continues below the value required to produce a grid bias equal to the critical value corresponding to the zero shield electrode bias of the gas tube, then the second stage (the last one operated) will cut off or return to normal, as a result of which the relay 49 will become un-energized, in turn, restoring relay 50 to normal, which in turn will place a short-circuit across its associated resistor 51, thus causing the oscillator grid direct current to increase. If this oscillator grid direct current continues to decrease (a condition which may be caused by increasing load) then the first stage will also cut off and cause relay 45 to become un-energized, in turn restoring relay 46 to normal. When relay 46 returns to normal, then resistor 47 will be short-circuited by the contacts of relay 46.

Resistors or potentiometers 66 and 68 are made variable in order to provide a control of the shield electrode negative bias for the gas tubes 44 and 48, thus enabling an adjustment of the range of difference between the operated and non-operated critical control grid bias for the gas tubes. This adjustment enables a compensation for differences in gas tubes due to normal manufacturing variations.

Although the system of Fig. 2 shows only two step controlled stages, it will be obvious that additional such stages can be provided if further reductions in the oscillator grid direct current are required, and these additional stages will also operate in sequence in the manner described above for Fig. 2.

In an embodiment of the invention tried out in practice, the system of Fig. 2 was employed in high frequency induction heating equipment, wherein the oscillator operated at about 400 kilocycles and furnished an output of 15 kilowatts.

What is claimed is:

1. In an oscillation generator system subject to variations in load conditions, an electron discharge device oscillator having an electrode and an electrical current circuit for said electrode, a direct current impedance through which said electrical current flows, another direct current impedance in series with said first impedance, a gaseous conduction device having a control electrode connected to a point on said first impedance, said gaseous conduction device also having an anode and being fired to pass current by the flow of electrical current in said first impedance above a predetermined value, means normally short-circuiting said second direct current impedance, and connections from said means to the anode of said gaseous conduction device, said connections being so arranged that the flow of current therein due to the firing of said gaseous conduction device removes the short-circuit from said second direct current impedance thus effectively inserting said second direct current impedance in said electrical current circuit.

2. In an oscillation generator system subject to variations in load conditions, an electron discharge device oscillator having an electrode and an electrical current circuit for said electrode, a potentiometer through which said electrical current flows, a resistor in said electrical current circuit, a grid-controlled gaseous conduction device having its control grid connected to a point on said potentiometer, said point determining the bias on said gaseous conduction device, said gaseous conduction device also having an anode and being fired by the flow of electrical current in said potentiometer above a predetermined value as a result of which the bias on said gaseous conduction device is reduced, and means coupled to the anode of said gaseous device normally short-circuiting said resistor and responsive to the flow of current through said gaseous conduction device for removing the short-circuit from said resistor.

3. In an oscillation generator system subject to variations in load conditions, an electron discharge device oscillator having an electrode and a direct current circuit for said electrode, a potentiometer through which said direct current flows, a resistor in said direct current circuit, a grid-controlled gaseous conduction device having its control grid connected to a point on said potentiometer, said point determining the bias on said gaseous conduction device, said gaseous conduction device being fired by the flow of direct current in said potentiometer above a predetermined value as a result of which the bias on said gaseous conduction device is reduced, said gaseous conduction device having an anode, a relay having an energizing winding in the anode circuit of said gaseous conduction device, a source of alternating current for the anode of said gaseous conduction device, said relay having a pair of contacts connected to the terminals of said resistor, said pair of contacts serving to short-circuit said resistor when the winding of said relay is un-energized, said relay being responsive to the flow of current through said gaseous device for removing the short-circuit from said resistor.

4. In an oscillation generator system subject to variations in load conditions, an electron discharge device oscillator having an electrode and a direct current circuit for said electrode, a potentiometer through which said direct current flows, a resistor in said direct current circuit, a grid-controlled gaseous conduction device having a cathode, a control grid and an anode, a relay having an energizing winding connected in the anode-cathode circuit of said gaseous conduction device, means for supplying alternating current to said anode-cathode circuit, a connection from said control grid to a point on said potentiometer, said point determining in part the operating bias for said gaseous device, said relay having a pair of contacts which engage in the non-operated condition of said relay, connections from the terminals of said resistor to said contacts, whereby said resistor is shunted out of the direct current circuit in the non-operated condition of said relay, said relay being responsive to the flow of current in said gaseous conduction device to thereby open said pair of contacts and effectively insert said resistor in said direct current circuit.

5. In an oscillation generator system subject to variations in load conditions, an electron discharge device oscillator having an electrode and a direct current circuit for said electrode, a potentiometer through which said direct current flows, a resistor in said direct current circuit, a grid-controlled gaseous conduction device having its control grid connected to a point on said potentiometer, said point determining the bias on said gaseous conduction device, said gaseous conduction device being fired by the flow of direct current in said potentiometer above a predetermined value, and means normally short-circuiting said resistor and responsive to the flow of current through said gaseous conduction device for removing the short-circuit from said resistor and for changing the operating characteristic of said gaseous conduction device.

6. In an oscillation generator system subject to variations in load conditions, an electron discharge device oscillator having an electrode and a direct current circuit for said electrode, a potentiometer through which said direct current flows, a resistor in said direct current circuit, a gaseous conduction device having a cathode, a control grid, a shield electrode and an anode, a connection from said control grid to a point on said potentiometer, said point determining in part the operating bias for said gaseous device, said gaseous device becoming conductive when the direct current in said direct current circuit exceeds a predetermined value, a resistor connected between said shield electrode and said cathode, a voltage regulator tube in series with said last resistor, said tube and last resistor being connected in shunt to said potentiometer, a relay having an energizing winding connected in the anode-cathode circuit of said gaseous conduction device, means for supplying alternating current to said anode-cathode circuit, said relay having two pairs of contacts, connections from the contacts of one pair to said shield electrode and cathode, means connected to the contacts of the other pair for short-circuiting the resistor in said direct current circuit, said relay being responsive to the flow of current in said gaseous conduction device for changing the electrical connection between said shield electrode and said cathode and for removing the short-circuit from the resistor in said direct current circuit, as a result of which the operating characteristic of said gaseous conduction device is changed and the resistor in said direct current circuit is effectively inserted into said circuit.

7. In an oscillation generator system subject to variations in load conditions, an electron discharge device oscillator having an electrode and a direct current circuit for said electrode, a potentiometer through which said direct current flows, a resistor in said direct current circuit, a gaseous conduction device having a cathode, a control grid, a shield electrode and an anode, a connection from said control grid to a point on said potentiometer, said point determining in part the operating bias for said gaseous device, said gaseous device becoming conductive when the direct current in said direct current circuit exceeds a predetermined value, a resistor connected between said shield electrode and said cathode, a voltage regulator tube in series with said last resistor, said tube and last resistor being connected in shunt to said potentiometer, a slow operating relay having an energizing winding connected in the anode-cathode circuit of said gaseous conduction device, means for supplying alternating current to said anode-cathode circuit, said relay having two pairs of contacts, connections from the contacts of one pair to said shield electrode and cathode, an alternating current circuit connected to the contacts of the other pair for short-circuiting the resistor in said direct current circuit, said slow operating relay being responsive to the flow of current in said gaseous conduction device for effectively connecting said shield electrode to said cathode and for removing the short-circuit from the resistor in said direct current circuit, as a result of which the operating characteristic of said gaseous conduction device is changed and the resistor in said direct current circuit is effectively inserted into said circuit.

8. In an oscillation generator system subject to variations in load conditions, an electron discharge device oscillator having an electrode and a direct current circuit for said electrode, a potentiometer through which said direct current flows, a pair of serially arranged resistors in said direct current circuit, a grid-controlled gaseous conduction device having its control grid connected to a point on said potentiometer, said point determining the bias on said gaseous conduction device, said gaseous conduction device also having an anode and being fired by the flow of direct current in said potentiometer above a pretermined value as a result of which the bias on said gaseous conduction device is reduced, means normally short-circuiting said pair of serially arranged resistors, and means coupled to said anode and responsive to the flow of current through said gaseous conduction device for removing the short-circuit from one of said resistors.

9. In an oscillation generator system subject to variations in load conditions, an electron discharge device oscillator having an electrode and an electrical current circuit for said electrode, a first current step control stage comprising a potentiometer through which said electrical current flows, a resistor in said electrical current circuit, a gaseous conduction device having a cathode, a control grid, a shield electrode and an anode, a connection from said control grid to a point on said potentiometer, said point determining in part the operating bias for said gaseous device, said gaseous device becoming conductive when the electrical current in said electrical current circuit exceeds a predetermined value, a resistor connected between said shield electrode and said cathode, a voltage regulator tube in series with said last resistor, said tube and last resistor being connected in shunt to said potentiometer, a relay having an energizing winding connected in the anode-cathode circuit of said gaseous conduction device, means for supplying alternating current to said anode-cathode circuit, said relay having two pairs of contacts, connections from the contacts of one pair to said shield electrode and cathode, means connected to the contacts of the other pair for short-circuiting the resistor in said direct current circuit, said relay being responsive to the flow of current in said gaseous conduction device for effectively connecting said shield electrode to said cathode and for removing the short-circuit from the resistor in said electrical current circuit, as a result of which the operating characteristic of said gaseous conduction device is changed and the resistor in said electrical current circuit is effectively inserted into said circuit, a second current step control stage similar to said first stage for removing a short circuit from a second resistor in said electrical current circuit, the connections from the control grids of the gaseous conduction devices of both stages to their associated potentiometers being so arranged as to provide different operating biases on said gaseous devices, whereby said stages operate in sequence.

10. In an oscillation generator system subject to variations in load conditions, an electron discharge device oscillator having an electrode and an electrical current circuit for said electrode, a potentiometer through which said electrical current flows, a resistor in said electrical current circuit, a gaseous conduction device having a cathode, a control grid, a shield electrode and an anode, a connection from said control grid to a point on said potentiometer, said point determining in part the operating bias for said gaseous device, said gaseous device becoming conductive when the current in said electrical current circuit exceeds a predetermined value, an impedance capable of passing direct current connected between said shield electrode and said cathode, a voltage regulator tube in series with said impedance, said tube and impedance being connected in shunt to said potentiometer, a relay having an energizing winding connected in the anode-cathode circuit of said gaseous conduction device, means for supplying operating current to said anode-cathode circuit, said relay having two pairs of contacts, connections from the contacts of one pair to said shield electrode and cathode, means connected to the contacts of the other pair for short-circuiting the resistor in said electrical current circuit, said relay being responsive to the flow of current in said gaseous conduction device for changing the electrical connection between said shield electrode and said cathode and for removing the short-circuit from the resistor in said electrical current circuit, as a result of which the operating characteristic of said gaseous conduction device is changed and the resistor in said electrical current circuit is effectively inserted into said circuit.

11. In an oscillation generator system, an electron discharge device having an electrode and an electrical circuit for said electrode, a potentiometer through which said electrical current flows, a gaseous conduction device having a cathode, a control grid, a shield electrode and an anode, a connection from said control grid to a point on said potentiometer, said point determining in part the operating bias for said gaseous device, said gaseous device becoming conductive when the current in said electrical current circuit exceeds a predetermined value, an impedance capable of passing direct current connected between said shield electrode and said cathode, a voltage regulator tube in series with said impedance, said tube and impedance being in shunt to said potentiometer, a relay having an energizing winding connected in the anode-cathode circuit of said gaseous conduction device, means for supplying operating current to said anode-cathode circuit, said relay having a pair of contacts, connections from said contacts to said shield electrode and cathode, said relay being responsive to the flow of current in said gaseous conduction device for changing the effective value of the electrical connection between said shield electrode and said cathode, as a result of which the operating characteristic of said gaseous conduction device is changed.

12. In an electron discharge device system subject to variations in load conditions, an electron discharge device having an electrode and an electrical current circuit for said electrode, a potentiometer through which said electrical current flows, a resistor in said electrical current circuit, a grid-controlled gaseous conduction device having its control grid connected to a point on said potentiometer, said point determining the bias on said gaseous conduction device, said gaseous conduction device also having an anode and being adapted to become conductive by the flow of electrical current in said potentiometer above a predetermined value as a result of which the bias on said gaseous conduction device is reduced, and means coupled to the anode of said gaseous device normally short-circuiting said resistor and responsive to the flow of current through said gaseous conduction device for removing the short-circuit from said resistor.

13. In an electron discharge device system subject to variations in load conditions, an electron discharge device having an electrode and a direct current circuit for said electrode, a potentiometer through which said direct current flows, a resistor in said direct current circuit, a grid-controlled gaseous conduction device having its control grid connected to a point on said potentiometer, said point determining the bias on said gaseous conduction device, said gaseous conduction device being adapted to become conductive by the flow of direct current in said potentiometer above a predetermined value, and means normally short-circuiting said resistor and responsive to the flow of current through said gaseous conduction device for removing the short-circuit from said resistor and for changing the operating characteristic of said gaseous conduction device.

GURDON H. WILLIAMS.

REFERENCES CITED

The following references are of record in the file of this patent:

UNITED STATES PATENTS

| Number | Name | Date |
|---|---|---|
| 1,938,160 | Wallace | Dec. 5, 1933 |
| 1,975,512 | Wallace | Oct. 9, 1934 |
| 2,026,874 | Eitel et al. | Jan. 7, 1936 |
| 2,320,876 | Marby | June 1, 1943 |
| 2,429,819 | Jordan | Oct. 28, 1947 |
| 2,441,435 | Mittelman | May 11, 1948 |

FOREIGN PATENTS

| Number | Country | Date |
|---|---|---|
| 520,605 | Great Britain | Apr. 29, 1949 |